E. D. McLEAN.
DOWNDRAFT STOVE OR FURNACE.
No. 11,623. Reissued July 27, 1897.
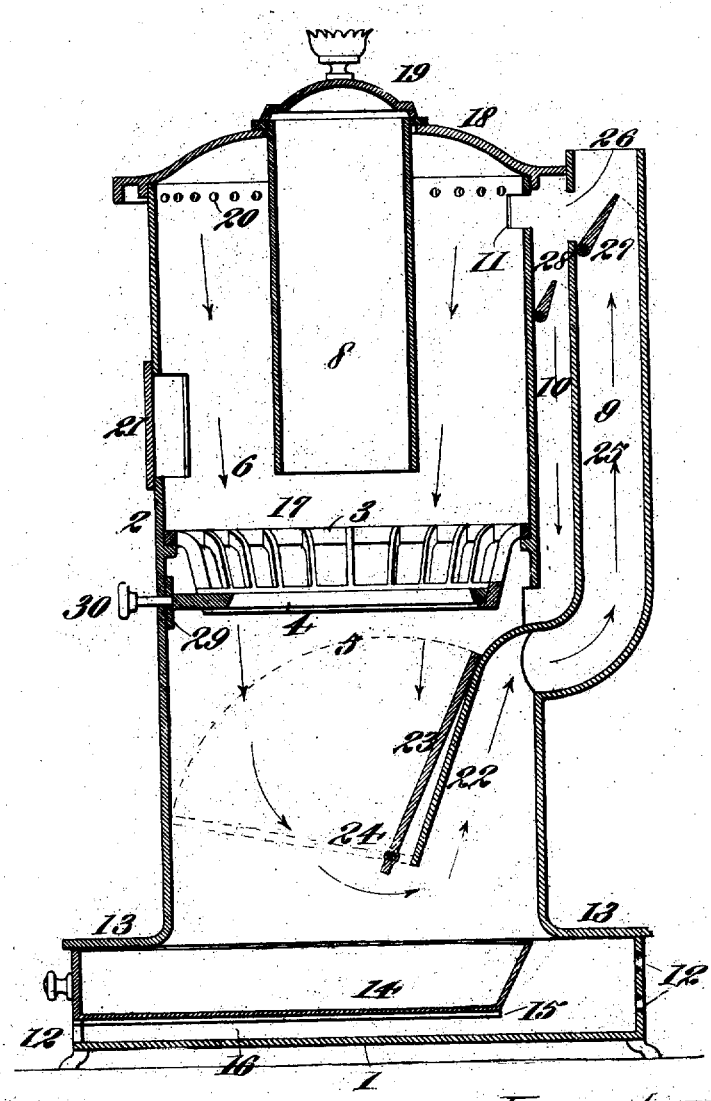
Attest:
E. S. Knight
N Finley.
Inventor:
E. D. McLean.
By Knight Bros atty's

UNITED STATES PATENT OFFICE.

EDWIN DEWHURST McLEAN, OF MARISSA, ILLINOIS.

DOWNDRAFT STOVE OR FURNACE.

SPECIFICATION forming part of Reissued Letters Patent No. 11,623, dated July 27, 1897.

Original No. 574,210, dated December 29, 1896. Application for reissue filed April 22, 1897. Serial No. 633,411.

*To all whom it may concern:*

Be it known that I, EDWIN DEWHURST McLEAN, a citizen of the United States, residing at Marissa, in the county of St. Clair and State of Illinois, have invented a certain new and useful Improvement in Downdraft Stoves or Furnaces, of which the following is a full, clear, and exact description, reference being had to the accompanying drawing, forming a part of this specification.

My invention relates to that class of stoves or furnaces which have for their object the heating of buildings; and it consists of the combination and arrangement of certain elements whereby a downdraft stove or furnace is provided in which either anthracite or bituminous coal may be fed, and which is adapted to be used both for direct radiation of heat and as a hot-air furnace, as will be more fully described hereinafter.

Referring to the drawing, the figure represents a vertical sectional view taken centrally.

In the drawing, 1 designates the base of the stove or furnace; 2 2, respectively, the basket and shaker grates; 5, the combustion-chamber, and 6 the fire-chamber.

8 is a magazine suspended from the top of the stove.

9 designates an updraft-passage leading from the lower portion of the stove to the upper portion, where it is adapted to discharge into the flue or stove-pipe leading to the chimney.

10 designates an auxiliary downdraft-passage which leads from an exit-opening 11 in the casing 2 at the upper end of the fire-chamber downward and into the combustion-chamber 5, immediately beneath the grates 3 and 4. By this arrangement of the auxiliary downdraft-passage 10 the gases and smoke arising from the burning fuel in the fire-chamber are conducted into the combustion-chamber 5 into close contact with the grates, and the fire takes up such gases and thoroughly consumes them and consumes the carbon in the smoke, a result that cannot be obtained unless the downdraft-passage does open into the combustion-chamber close to the fire-grate.

In constructing my furnace I preferably make the casing of pressed steel or cast-iron, or other metals may suitably be used and the castings may be of a cylindrical or other form. The base 1 is preferably separable and is provided with short legs. Upon the base are front, back, and side panels having open-work 12, upon which the flanges 13 of the casing rest. Above the base is an ash-pan 14, arranged to slide upon supports 15, there being an air-space 16 between the base and the bottom of the ash-pan. The basket-grate 3, having curved bars 17, is suitably supported about midway between the top and bottom of the case. The shaking-grate 4 is supported at the bottom of the basket-grate. Above the grates, around the fire-chamber, any suitable iron or fire-brick lining for the casing may be used.

18 designates the stove or furnace top provided with a cover 19, located above the magazine 8. Near the top of the casing 2 are perforations 20 to admit air to the fire-chamber, but in some cases I may use instead a number of adjustable registers to admit air. At any suitable point, preferably at the front, I provide a door 21.

The updraft-passage 9 is preferably at the rear of the stove or furnace and communicates with the combustion-chamber, and over the opening thereto is an apron-like partition 22, extending from above the opening downward in a slanting direction, and across the combustion-chamber, terminating near the bottom thereof, a damper 23 is hung on a rod 24, which may have at its end outside of the casing any suitable knob or ring for operating the damper. The auxiliary downdraft-passage 10 enters the combustion-chamber above the upper end of the partition 22 immediately below the grates, as already mentioned. The two draft-passages are supported by a partition 25, in which is an outlet-opening 26, that is controlled by a damper 27, operated by a pivot-rod extending to the exterior of the stove or furnace. The auxiliary downdraft-passage 10 is controlled by a damper 28, pivotally hung in the same manner as the damper 27.

The shaking-grate 4 has a reduced portion, around which is fitted a plate 29 to cover the slot in which the bar works. On the upper end of the shaker-bar is an operating-rod 30.

Under the various conditions in operation the several dampers may be advantageously opened or closed as the circumstances require. The damper 23 may be dropped down, as indicated by the dotted lines, so that when removing ashes all dust will pass up the flue through the passage 9. When operated as a downdraft-heater, the chamber 28 should be open to permit the gases or products of combustion to pass downward through the passage 10. As the object of this auxiliary downdraft-passage is to carry off any smoke or gas that might arise from the coal or other fuel should the grate become clogged, or from any other cause, or when operating as a downdraft-furnace, the damper 28 may close the passage 10 and the damper 27 close the passage 9, permitting a draft from the fire-chamber direct to the flue. The several dampers may also be suitably located in any intermediate graduating position desired.

Such gases or smoke as rise off the fire may pass down through auxiliary downdraft-passage and mix with the other products of combustion in the combustion-chamber below the grate, then out through the updraft to the flue. This auxiliary downdraft is not intended at any time when the fire is burning at full force to carry off all the products of combustion, but the object in providing it is to carry off such gases or smoke as may arise at any time or should the grate become stopped up, in which case the fire would burn slow and very little gas or smoke arise. One main object of this downdraft is to supply the grate with air in a sufficient quantity to prevent it from becoming overheated and to supply that air in such a quantity and condition that the general draft of the stove or furnace may not be affected, the air passing down between the two heated walls—that is to say, the stove-body on the one side and the partition next to the updraft-passage expands or superheats the air so that the effect on the general downdraft is not affected.

By making suitable connections for hot-air pipes my furnace may be readily adapted for heating by this means. The object of the partition 22 is to divide the combustion-chamber into two parts and to carry the heat-waves down to the bottom of the stove or furnace and provide a means for retaining and deflecting the gases that pass down through the auxiliary draft with the product of combustion that passes directly through the grate. By this apron-like partition the gases after mixing are spread as they pass under the lower end of said partition and combustion becomes more complete, having the same function as a bridge-wall in a boiler-furnace.

I claim as my invention—

1. A heating stove or furnace, consisting of a base, an ash-pan having air-circulating spaces at bottom and around the back and sides thereof, a casing above said base, a basket-grate and a shaking-grate supported in said casing, a fire-chamber above and a combustion-chamber below said grates arranged to be filled at the top thereof, a door opening into said fire-chamber, means for admitting air into the upper part of said fire-chamber, an auxiliary downdraft-passage leading from the upper part of said fire-chamber to the upper part of said combustion-chamber, a damper hung in said downdraft-passage arranged to open and close said passage, a partition situated below said downdraft-passage lower opening extending across said combustion-chamber and to near the bottom thereof, a damper hung and arranged to connect the bottom of said partition and divide said combustion-chamber into an upper and lower compartment, an upper draft-passage leading from said lower compartment to the upper part of said furnace, a communicating passage between said auxiliary passage and said updraft-passage near the top thereof, and a damper arranged to either close said communicating passage or said draft-passage, substantially as and for the purpose shown and described.

2. The combination in a stove or furnace, of a casing, a fire-grate within said casing, a partition located beneath said fire-grate and extending downward to a point near the bottom of the combustion-chamber, a damper closing the space between said partition and the casing, an updraft-passage provided at the rear of the casing and opening into the combustion-chamber back of said partition, and opening into the flue, an auxiliary downdraft-passage provided contiguous to said updraft-passage, a damper in said auxiliary downdraft-passage, and a damper in said updraft-passage arranged to control either of said passages or the opening between said updraft-passage and said auxiliary downdraft-passage, substantially as and for the purpose shown and described.

3. The combination in a stove or furnace, of a casing, a fire-grate within said casing, a partition located beneath said fire-grate and extending downward to a point near the bottom of the combustion-chamber, a damper closing the space between said partition and the casing, an updraft-passage provided at the rear of the casing and opening into the combustion-chamber back of said partition and opening into the flue, a damper located in said passage, an auxiliary downdraft-passage provided with an opening into the fire-chamber above the grate and an opening into the combustion-chamber beneath the grate, and a damper located in said auxiliary passage, substantially as and for the purpose shown and described.

4. The combination in a stove or furnace of a casing, a fire-grate within said casing, a fire-chamber above said grate, a combustion-chamber below said grate, a partition in said combustion-chamber, an updraft-passage provided in connection with said casing and opening out of said combustion-chamber at the rear of said partition, and arranged to open into a flue, an auxiliary downdraft-passage provided in connection with said casing and opening out of said fire-chamber and opening into said combustion-chamber immediately beneath said grate above said partition, substantially as and for the purpose shown and described.

EDWIN DEWHURST McLEAN.

In presence of—
E. S. KNIGHT,
N. FINLEY.